Sept. 21, 1937. C. F. DAWSON 2,093,712
FROZEN CONFECTIONERY PRODUCT
Filed Nov. 19, 1931
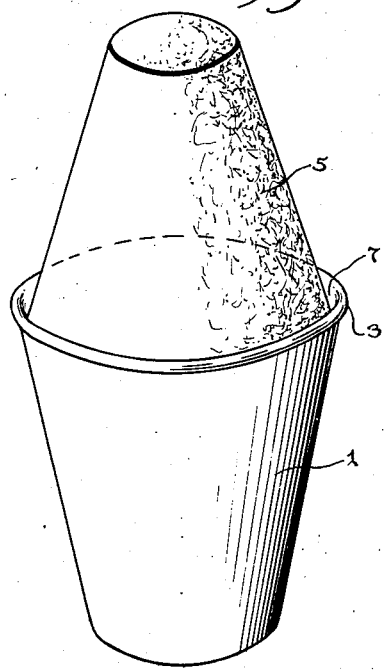
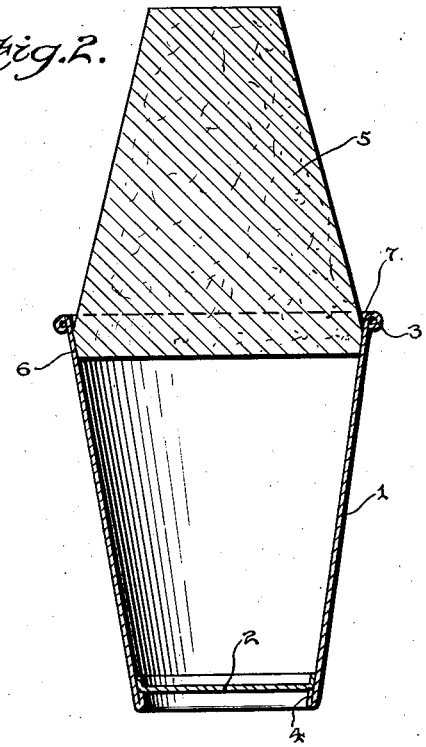
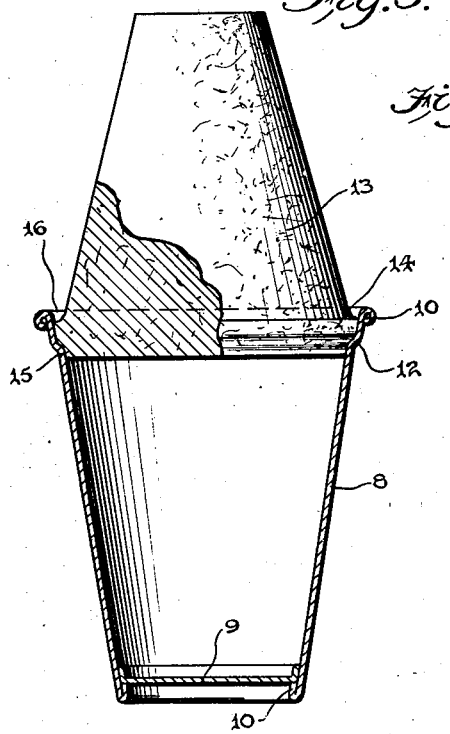
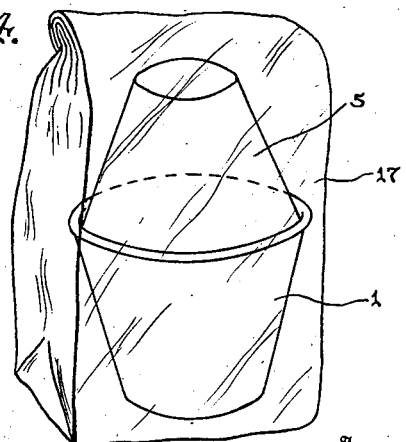
Inventor
Cecil F. Dawson,
By Milans & Milans
Attorneys Patented Sept. 21, 1937

2,093,712

UNITED STATES PATENT OFFICE 2,093,712

FROZEN CONFECTIONERY PRODUCT

Cecil F. Dawson, Easton, Pa., assignor, by mesne assignments, to Dixie-Vortex Company, Chicago, Ill., a corporation of Delaware Application November 19, 1931, Serial No. 576,170

1 Claim. (Cl. 99—137)

My invention relates to new and useful improvements in frozen confectionery products and has for its principal object the provision of a preformed mass or slug of water ice, sherbert or the like adapted to be placed in the open end of a container, the container being formed of readily flexible and destructible material adapted for but a single use and providing a holder or handle while eating the frozen material, it being understood that the mass or slug may be placed within the open end of the container at the time of manufacture for delivery to the retailer as a unitary product or the frozen masses or slugs may be delivered to the retailer and placed into the open end of the container at the time that a sale is made.

Another object of the invention resides in forming the frozen mass or slug with an end portion adapted to cooperate with the inner wall of the container or receptacle for supporting the mass or slug in projecting position so that the same may be eaten by the person while the container or receptacle is held in the hand.

A further object of the invention consists in forming the end of the slug or mass with a beveled or inclined portion cooperating with an inclined or tapered inner wall of the container or receptacle to position the mass or slug in projecting position to be eaten, the end of the container or receptacle projecting beyond the point where the mass or slug engages the wall of the container or receptacle so as to provide a flange or valley to receive drippings from the mass or slug as the same may melt.

Still another object of the invention resides in the provision of a readily flexible container or receptacle adapted to receive and support a frozen mass or slug of edible material, the compressing of the readily flexible container or receptacle acting to raise or slide the mass or slug upwardly should the same have a tendency to slide or drop into the container or receptacle due to melting.

With the above and other objects in view, which will appear as the description proceeds, my invention consists in the novel details of construction, and arrangement of parts, described in the following specification and illustrated in the accompanying drawing, and while I have illustrated and described the preferred embodiments of the invention, as they now appear to me, it will be understood that such changes may be made as will fall within the scope of the appended claim.

In the drawing:—

Fig. 1 is a perspective.

Fig. 2 is a transverse vertical section through an associated mass or slug of frozen material and container or receptacle.

Fig. 3 is a transverse vertical section through a mass or slug of the frozen confection and a container or receptacle, with parts of the mass or slug shown in elevation illustrating a slightly modified form of the invention; and Fig. 4 is a perspective showing one of the products within a transparent bag for service.

In the drawing 1 indicates a container or receptacle of tapered form, preferably of paper or similar readily flexible material, having the bottom portion 2 and the bead 3 at its upper normally open end. The lower edge of the wall of the container or receptacle 1 is turned inwardly and upwardly as shown at 4 to a position beneath the bottom 2, as shown more particularly in Fig. 2 of the drawing.

At 5 I have illustrated a preformed frozen mass or slug of water ice, sherbert, or similar material, this mass or slug having the inwardly tapered wall or portion at one end to be received within the open end of the container or receptacle 1, the taper 6 conforming to the taper of the container or receptacle to position the end of the mass or slug to provide the valley or trough 7 to receive drippings as the mass or slug may melt. In other words the end of the mass or slug is seated on the inner wall of the container or receptacle 1, below the upper rolled end thereof, the upper end of the container or receptacle providing a flange extending around the wall of the mass or slug to provide the valley or trough 7, as previously described. While I have illustrated the mass or slug of the shape shown in the drawing it will be understood that other shapes might be provided without departing from the spirit of the invention.

In Fig. 3 of the drawing I have shown a slightly modified form of the invention in which the container or receptacle 8 is formed with the bottom portion 9 and rolled edge 10 at the normally open end, the lower end of the body forming the container or receptacle 1 being turned inwardly and upwardly as shown at 11 to engage the under surface of the bottom 9. In this form of the invention disclosed in Fig. 3 the container or receptacle is formed adjacent its normally open upper end with an outwardly directed portion 12 providing a seat for the end of the mass or slug 13 of frozen material, the mass or slug being provided, adjacent that end which is received within the open end of the container or receptacle with an outwardly and circumferentially extending rib or flange 14 adapted to be received upon the seat 12, as shown. The portion 15 of the slug or mass below the flange or rib 14 will be tapered to conform to the taper of the inner face of the container or receptacle 8. As in the form of the invention disclosed in Figs. 1 and 2 of the drawing the upper end of the container or receptacle projects into a position relative to the outer face or wall of the slug to provide the valley or trough 16 for receiving drippings.

In Fig. 4 of the drawing I have illustrated the unitary product, including the mass or slug and container or receptacle positioned within a transparent bag 17 and while I have illustrated the bag as being normally open at the top for introducing the product it will be understood that the same might be inverted so that the product might be introduced from the bottom thereof, if found desirable. The product may be placed within the bag either at the factory, if found desirable, or may be placed therein by the retailer at the time of sale. This bag maintains the product in a sanitary condition either prior to sale or after sale while being carried to some distant point.

As stated in the objects of the invention the frozen mass or slug of edible material may be placed in the open end of the container either at the point of manufacture or by the retailer when he makes his sale. The purchaser will grasp the container or receptacle which acts as a handle and support for the frozen mass or slug and as the mass or slug projects beyond the end of the container it may be readily eaten while the container is held by the hand. Any drippings due to the melting of the mass or slug will be received within the trough or valley formed by the upwardly projecting portion of the container or receptacle so as not to engage the hand of the user. At the same time should the mass or slug tend to drop or slide into the container or receptacle it may be forced upwardly by squeezing or compressing the wall of the container or receptacle which, as previously stated, is made of readily flexible material such as paper or the like. Of course, the container or receptacle itself will also catch drippings from the mass or slug and after the solid portions have been eaten the user may drink any liquid which has accumulated within the container or receptacle. In use I have found that where the mass or slug is of water ice, sherbert or the like, the same will have a tendency to adhere or stick to the wall of the container or receptacle thereby preventing the same from falling therefrom while being consumed.

Having fully described my invention what I claim as new and desire to secure by Letters Patent is:—

As a new article of manufacture, an individual service of ice, ice cream or the like, frozen to give the same a predetermined completed unitary formation of normal uniform consistency, the same having a relatively wide flat end and a tapered body portion receding therefrom, whereby the individual service may without reforming, packing or condensing, be received and held by a supporting container with the surface projecting therefrom, the relatively wide flat end having a relatively shallow portion tapered inwardly in a direction opposite to the taper of the body portion with an outwardly extending bead at the juncture of the opposite tapers, and the supporting container being formed of relatively flexible material having a tapered wall, a normally open mouth to receive the wide end portion of the service, and a seat inwardly of the mouth, the relatively shallow tapered portion of the wide flat end being engaged with the tapered wall while the outwardly extending bead is received on the seat below the edge of the mouth to provide a channel to receive drippings from the service and to have the major portion of the flexible tapered wall of the container below the end of the service whereby the wall may be flexed below the end of the service to urge the same upwardly.

CECIL F. DAWSON.